United States Patent
Schilling et al.

[19]

[11] Patent Number: 5,873,557
[45] Date of Patent: Feb. 23, 1999

[54] DEVICE FOR SUPPORTING OBJECTS SO AS TO BE ROTATABLE ABOUT AN AXIS OF ROTATION

[75] Inventors: Uwe Schilling, Solms; Martin Rudolph, Wetzlar; Stefan Voit, St. Ingbert, all of Germany

[73] Assignee: Mannesmann VDO AG, Frankfurt, Germany

[21] Appl. No.: 909,274

[22] Filed: Aug. 11, 1997

[30] Foreign Application Priority Data

Aug. 16, 1996 [DE] Germany .................. 196 33 003.3

[51] Int. Cl.⁶ ............................................. A47B 91/100
[52] U.S. Cl. ................................. 248/349.1; 248/131
[58] Field of Search ................. 248/316.1, 346.01, 248/349.1, 131, 346.03, 346.05, 362, 224.8, 225.52, 221.12, 222.14, 224.7, 307, 231.41, 231.51, 551, 918, 922, 222.41, 225.21; 403/164, 165, 353, 319, 331

[56] References Cited

U.S. PATENT DOCUMENTS

| 913,056 | 2/1909 | Rounds | 59/95 |
|---|---|---|---|
| 917,349 | 4/1909 | Opsal | 59/95 |
| 4,037,978 | 7/1977 | Connelly | 403/164 |
| 4,415,136 | 11/1983 | Knoll | 248/181 |
| 4,562,988 | 1/1986 | Bumgardner | 248/349 |
| 4,946,127 | 8/1990 | Kaluga | 248/551 |
| 5,051,021 | 9/1991 | Pelz | 403/406.1 |
| 5,116,382 | 5/1992 | Steinkamp et al. | 623/38 |
| 5,167,478 | 12/1992 | Ramunas | 409/234 |
| 5,607,250 | 3/1997 | Tatterson et al. | 403/325 |
| 5,687,944 | 11/1997 | Shon | 248/349.1 |
| 5,697,588 | 12/1997 | Gonzalez et al. | 248/221.11 |

*Primary Examiner*—Ramon O. Ramirez
*Assistant Examiner*—Tan Le
*Attorney, Agent, or Firm*—David M. Thimmig; Mayer Brown & Platt

[57] ABSTRACT

The invention relates to a device for supporting objects (1) so as to be rotatable about an axis of rotation (2), particularly, display devices in motor vehicles.

The object of realizing such a device which is simple and cheap and which enables the object to be removed simply and rapidly, is achieved in that there has been provided a basic body (4) having a recess (14) which is open in a radial direction, there has been provided a rotary body (3) adapted to be slid into the recess (14) in a radial direction and to be rotatable in the recess (14), there has been provided a locking bracket (9) by means of which the rotary body (3) can be locked against radial movement in the recess (14), and the rotary body (3) can be locked in rotation to the object (1) in such a manner that the rotary body (3) is rotated when the object (1) is rotated in the basic body (4).

15 Claims, 2 Drawing Sheets

: 1

DEVICE FOR SUPPORTING OBJECTS SO AS TO BE ROTATABLE ABOUT AN AXIS OF ROTATION

BACKGROUND OF THE INVENTION

The invention relates to a device for supporting objects so as to be rotatable about an axis of rotation, particularly, display devices in motor vehicles.

Such devices are used, for example, for rotatably mounting the displays of navigation systems. In the Philips navigation system CARIN the display is mounted on the dashboard by means of a complex holder having two axes of rotation. Other manufacturers of navigation systems use ball-and-socket joints for mounting the display. Both solutions are intricate and expensive. In the case of both solutions it is difficult and troublesome to remove the display from the holder. In order to adjust the position of the display it is necessary to loosen screws or levers, which should be tightened again upon adjustment.

The present invention aims at providing a device of the type defined in the opening paragraph, which is simple and cheap and which enables the object to be removed simply and rapidly.

According to the invention this is achieved in that there has been provided a basic body having a recess which is open in a radial direction, there has been provided a rotary body adapted to be slid into the recess in a radial direction and to be rotatable in the recess, there has been provided a locking bracket by means of which the rotary body can be locked against radial movement in the recess, and the rotary body can be locked in rotation to the object in such a manner that the rotary body is rotated when the object is rotated in the basic body.

Locking in rotation is to be understood to mean that a rotation of the object directly brings about a rotation of the rotary body. This can be achieved, for example, in that the rotary body and the object are fixedly connected, for example screwed, to one another. However, locking in rotation can also be achieved in that, for example, the object comprises guide pins clamped or snapped into guide slots of the rotary body.

For rotatably supporting the object, the user slides the rotary body and the object, which has been locked in rotation to this body, by hand into the recess in the basic body in a radial direction, i.e. perpendicularly to the axis of rotation. Subsequently, the rotary body is locked against radial movement in the recess by means of the locking bracket, the rotary body and the object thus being rotatably held in the basic body.

This device can be manufactured simply and at low cost. The rotary body and the object can be removed from the basic body in a radial direction in that the locking bracket is swivelled away in a radial direction and can just as simply be refitted in the basic body in the reverse sequence.

OBJECT AND SUMMARY OF THE INVENTION

In an advantageous embodiment of the invention the rotary body has at least a first and a second circular cross-section in an axial direction, which second cross-section differs from the first cross-cross-section, the recess in the basic body has a third cross-section in an axial direction, which third cross-section is at least partly substantially identical to the first cross-section, and the recess in the basic body has a fourth cross-section in an axial direction, which fourth cross-section is at least partly substantially identical to the second cross-section, in such a manner that the rotary body can be locked against axial movement in the recess in the basic body.

By means of such a construction of the rotary body and the basic body the rotary body can be locked against axial movement in the basic body in a very simple manner. In the direction of the axis of rotation the rotary body has a first circular cross-section of a first diameter and a second circular cross-section of a second diameter which differs from the first diameter. The recess in the basic body has been formed accordingly and consequently has a partly circular third cross-section whose diameter essentially corresponds to the diameter of the first cross-section. The recess in the basic body further has a partly circular fourth cross-section whose diameter essentially corresponds to the diameter of the second cross-section of the rotary body. Owing to the different cross-sectional diameters the rotary body is locked against axial movement at the transition between the different cross-sections. An additional axial locking of the rotary body can be obtained by means of the locking bracket.

A further advantageous embodiment of the invention is characterized in that the locking bracket is rotatably mounted on the basic body.

A rotatable mounting of the locking bracket on the basic body can be realized very simply, for example in that the locking bracket comprises a pivot which engages in a circular bore in the basic body.

A further advantageous embodiment of the invention is characterized in that in an axial direction the recess in the basic body takes the form of a hole, the basic body is adapted to be secured to a base, and the surface of the base forms a radially oriented guide surface for the rotary body.

The basic body can be secured to the base, for example, by means of screwthread joints, adhesive joints or welded joints. The base can be, for example, a flexible gooseneck, a part of a dashboard of a motor vehicle, or another stationary element in the interior of the motor vehicle. Since the surface of the base is used as a guide surface for the rotary body the basic body can be very thin. This yields a material and cost saving.

This embodiment of the invention can be modified advantageously in that the surface of the base is flat at the location of the guide surface.

If the surface of the base is plane, i.e. flat, at the location of the guide surface the basic body can also be flat at this location. This is very favorable in view of production-engineering. However, the basic body can also be constructed in such a manner that a flat surface of the base is not required owing to an appropriate profile.

In a further advantageous embodiment of the invention the locking bracket comprises a latching hook which is engageable in a latching recess in the basic body.

In another advantageous embodiment of the invention the rotary body is integral with the object and/or the basic body is integral with the base.

The device in accordance with the invention is preferably used for rotatably supporting an electronic apparatus, for rotatably supporting a display device of a navigation system, or for rotatably supporting a display device of a television system of a motor vehicle.

BRIEF DESCRIPTION OF THE DRAWINGS

An embodiment of the invention will now be described in more detail, by way of example, with reference to FIGS. 1 to 3 of the drawings. In the drawings.

DETAILED DESCRIPTION OF THE PREFERRED EMBODIMENT

Figure 1:
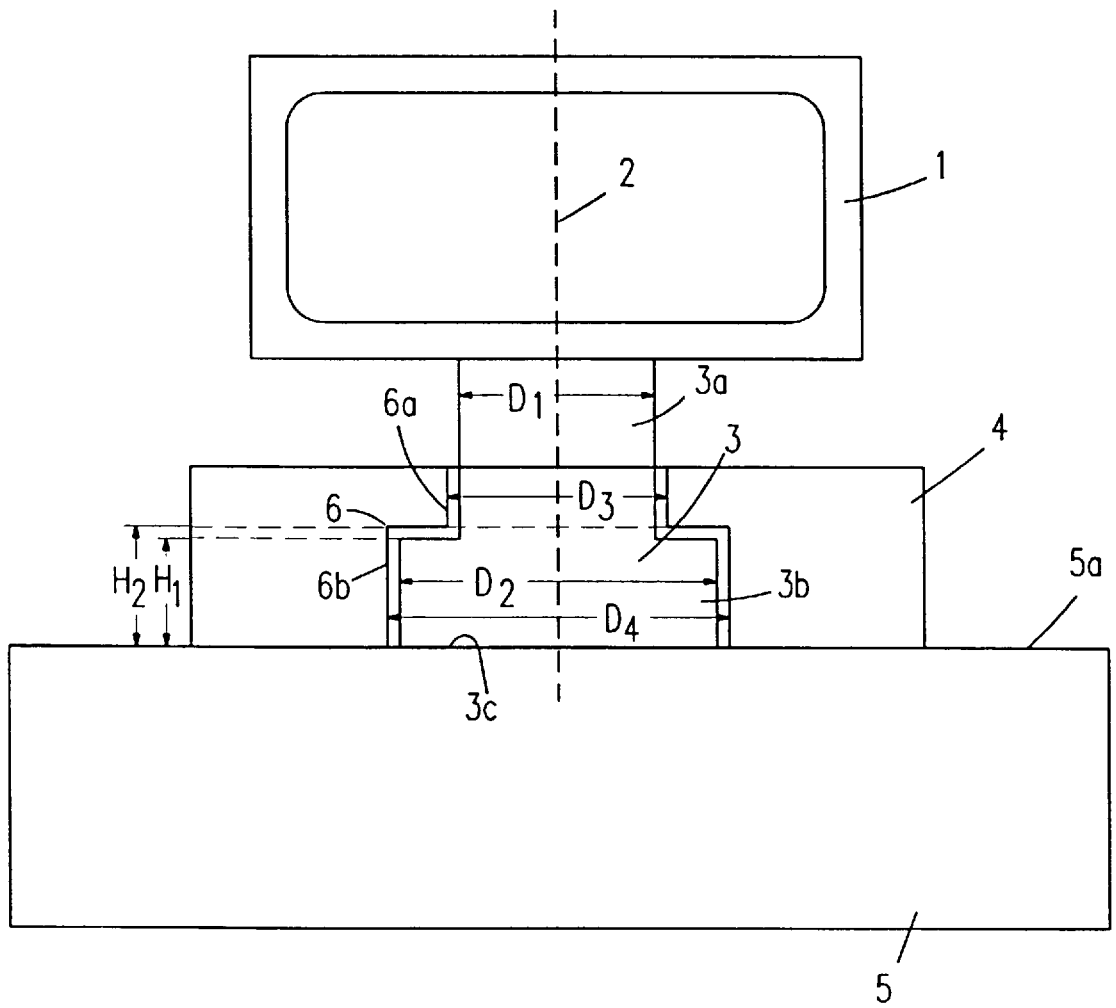
FIG. 1 is a diagrammatic side view of the embodiment with a display screen which is rotatably supported on a base by means of a rotary body and a basic body.

The diagrammatic representation in FIG. 1 shows a device for rotatably supporting an object. The object is a display device 1 which is to be supported so as to be rotatable about an axis of rotation 2. The display device 1 can be, for example, a display of a navigation system of a motor vehicle or a display screen of a television system of a motor vehicle. A rotary body 3 is secured to the display device 1 in a manner, not shown. This is preferably effected by screwthread joints. The rotary body 3 has a cylindrical shape and has a first outer diameter $D_1$ in a first part 3a and a second outer diameter $D_2$ in a second part 3b, the outer diameter $D_1$ being smaller than the outer diameter $D_2$. The rotary body 3 has a lower surface 3c. A basic body 4 is secured to a base 5 having an upper surface 5a. The basic body 4 is preferably secured to the base 5 by screwthread joints. The base 5 can be, for example, an adjustable gooseneck or the dashboard of a motor vehicle. The basic body 4 has a partly circular hole 6 having a first inner diameter $D_3$ in a first part 6a and a second inner diameter $D_4$ in a second part 6b. The first inner diameter $D_3$ of the basic body 4 has been selected slightly greater than the first outer diameter $D_1$ of the rotary body 3 and the second inner diameter $D_4$ of the basic body 4 has been selected slightly greater than the second outer diameter $D_2$ of the rotary body 3.

The second part 3b of the rotary body 3 has an axial height $H_1$ in the direction of the axis of rotation 2, and the second part 6b of the hole 6 in the basic body 4 has an axial height $H_2$ in the direction of the axis of rotation 2. The axial height $H_2$ of the second part 6b of the hole 6 is slightly greater than the axial height $H_1$ of the second part 3b of the rotary body 3. Thus, the rotary body 3 interlocks with the hole 6 in the basic body 4. The upper surface 5a of the base 5 acts as a guide surface for the lower surface 3c of the rotary body 3.

Figure 2:
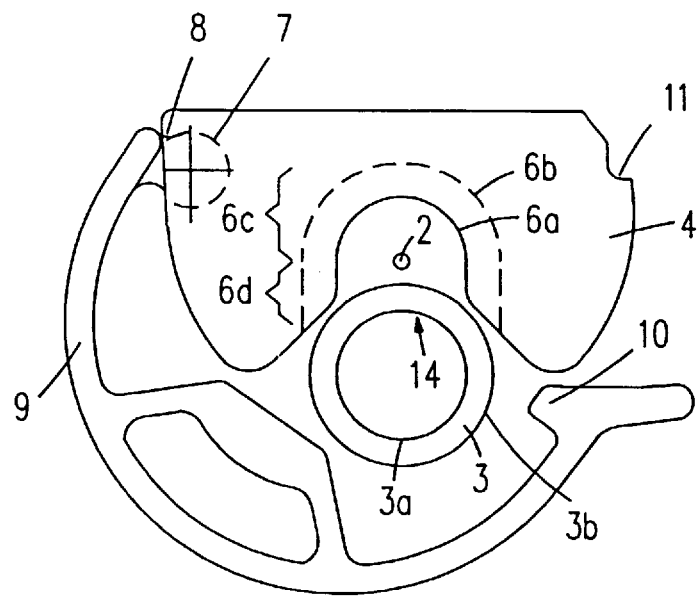
FIG. 2 is a diagrammatic plan view of the embodiment, the rotary body being situated outside a recess in the basic body and a locking bracket being in an unlocked position.

FIG. 2 is a plan view of the basic body 4 and the rotary body as shown in FIG. 1, the display device 1 and the base 5 not being shown for the sake of clarity. The basic body 4 has a cylindrical bore 7 in which a cylindrical pin 8 of a locking bracket 9 is rotatable. For the sake of clarity the locking bracket 9, the pin 8 and the cylindrical bore 7 are not shown in FIG. 1. In a radial direction, i.e. perpendicularly to the axis of rotation 2, the hole 6 in the basic body 4 takes the form of a recess 14 which is open at one side and has a partly circular part 6c, which changes into a part 6d of the hole. In FIG. 2 the rotary body 3 is situated outside the partly circular part 6c of the hole in the basic body 4 and the locking bracket 9 is in a non-locked position, thus enabling the locking bracket 9 to be swivelled away in a clockwise direction and the rotary body 3 and, consequently, also display device 1 secured thereto and not shown in FIG. 2, can be removed from the hole 6 in the basic body 4.

Figure 3:
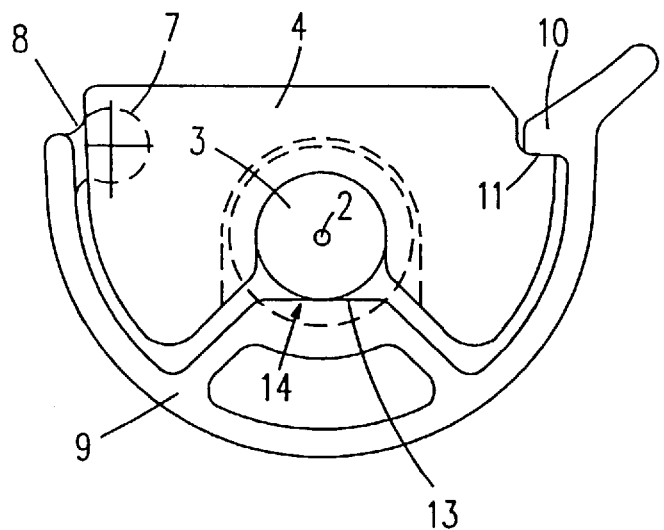
FIG. 3 is a diagrammatic plan view of the embodiment, the rotary body being situated in the recess in the basic body and the locking bracket being in a locked position.

FIG. 3 is a diagrammatic plan view similar to that in FIG. 1, the locking bracket 9 and the rotary body 3 being in a locked position. For this purpose, the rotary body 3 has been inserted into the hole 6 in the basic body 4 in a radial direction, i.e. perpendicularly to the axis of rotation 2. The locking bracket 9 has been swivelled counter-clockwise with respect to the position shown in FIG. 2 and has assumed a locked position relative to the basic body 4. To this end, the locking bracket 9 has a latching nose 10 which has engaged a latching recess 11 in the basic body 4. In this locked position a stop edge 13 of the locking bracket 9 engages against the part 3a of the rotary body 3, thereby locking the rotary body 3 against radial movement in a direction perpendicular to the axis of rotation 2. The rotary body 3 is locked in the direction of the axis of rotation 2 owing to the different diameters of the parts 3a and 3b of the rotary body 3 and of the parts 6a and 6b of the hole 6. Thus, the rotary body 3 and hence the display device 1 secured to the rotary body 3 are rotatably supported on the basic body 4 and the base 5 in the situation shown in FIG. 3.

By pivoting the locking bracket 9 clockwise the rotary body 3 can be unlocked and the monitor 1 and the rotary body 3 can be removed very simply from the hole 6 and the recess 14 of the basic body 4 in a lateral direction.

We claim:

1. A device for supporting objects (1) so as to be rotatable about an axis of rotation (2), the device comprising:
   a body (4) having a recess (14) which is open in a radial direction;
   a rotary body (3) adapted to be slidable into the recess (14) in a radial direction and to be rotatable in the recess (14), the rotary body (3) having a side wall;
   a locking bracket (9) adapted to engage the side wall of the rotary body (3) in the recess (14),
   whereby the rotary body (3) is locked against radial movement in the recess (14).

2. A device as claimed in claim 1, wherein the rotary body (3) has at least a first and a second circular cross-section in an axial direction, which second cross-section differs from the first cross-section, the recess (14) in the body (4) has a third cross-section in an axial direction, which third cross-section is at least partly substantially identical to the first cross-section, and the recess (14) in the body (4) has a fourth cross-section in an axial direction, which fourth cross-section is at least partly substantially identical to the second cross-section, in such a manner that the rotary body (3) is locked against axial movement when inserted in the recess (14) in the body (4).

3. A device as claimed in claim 1, wherein the locking bracket (9) is pivotally mounted on the body (4).

4. A device as claimed in claim 1, wherein in an axial direction the recess (14) in the body (4) takes the form of a hole (6), the body (4) is adapted to be secured to a base (5), and the surface (5a) of the base (5) forms a radially oriented guide surface for the rotary body (3).

5. A device as claimed in claim 4, wherein the surface (5a) of the base (5) is flat at the location of the guide surface.

6. A device as claimed in claim 1, wherein the locking bracket (9) further comprises a latching hook (10) which is engageable in a latching recess (11) in the body (4).

7. A device as claimed in claim 1, wherein the rotary body (3) is integral with the object (1).

8. A device as claimed in claim 4, wherein the body (4) is integral with the base (5).

9. A device as claimed in claim 1, wherein the rotary body (3) is adapted to be fixedly connected to the object (1).

10. A device as claimed in claim 4, wherein the body (4) is adapted to be fixedly connected to the base (5).

11. A device for supporting an object such as an electronic apparatus so as to be rotatable about an axis of rotation, the device comprising:

a body adapted to be connected to a base, the body having a recess which is open in a radial direction;

a rotary body adapted to be slidable into the recess in a radial direction and to be rotatable in the recess;

a locking bracket adapted to releasably lock the rotary body in the recess of the body.

12. A device as claimed in claim 11, wherein the locking bracket is pivotally connected to the body and further comprises a latching hook, the body further comprises a latching recess and the latching hook of the latching bracket is engageable with the latching recess of the body.

13. A device as claimed in claim 11, wherein the rotary body further comprises side walls, the locking bracket further comprises a bearing surface adapted to engage the side walls of the rotary body when the rotary body is locked in the recess of the body.

14. A device as claimed in claim 11, wherein the rotary body is integral with the object.

15. A device as claimed in claim 11, wherein the body is integral with the base.

* * * * *